United States Patent
Lee

(10) Patent No.: US 10,625,805 B2
(45) Date of Patent: Apr. 21, 2020

(54) FIXING STRUCTURE FOR HANDLEBAR GRIP AND SIDE MIRROR OF BICYCLE

(71) Applicant: Dong-Lie Lee, Taichung (TW)

(72) Inventor: Dong-Lie Lee, Taichung (TW)

( * ) Notice: Subject to any disclaimer, the term of this patent is extended or adjusted under 35 U.S.C. 154(b) by 0 days.

(21) Appl. No.: 15/879,414

(22) Filed: Jan. 24, 2018

(65) Prior Publication Data
US 2019/0225292 A1    Jul. 25, 2019

(51) Int. Cl.
*B62K 21/26* (2006.01)
*B62K 21/12* (2006.01)
*B62J 29/00* (2006.01)
*G02B 7/182* (2006.01)

(52) U.S. Cl.
CPC ............... *B62J 29/00* (2013.01); *B62K 21/12* (2013.01); *B62K 21/26* (2013.01); *G02B 7/1824* (2013.01)

(58) Field of Classification Search
CPC ...... B62K 21/26; B62K 21/12; B62K 21/125; B60R 1/06; B62J 29/00
See application file for complete search history.

(56) References Cited

U.S. PATENT DOCUMENTS

| | | | | |
|---|---|---|---|---|
| 5,297,445 A * | 3/1994 | Chen | ................... | B62K 21/125 403/122 |
| 6,164,860 A * | 12/2000 | Kondo | ................... | B62D 7/22 280/93.51 |
| 7,637,686 B2 * | 12/2009 | Wood | ................... | B64C 1/066 244/118.1 |
| 7,780,298 B2 * | 8/2010 | Greathouse | ................... | B60R 1/06 248/475.1 |
| 7,866,002 B2 * | 1/2011 | Wang | ................... | B62K 21/26 16/421 |
| 8,038,332 B2 * | 10/2011 | Lin | ................... | B60Q 1/2665 362/494 |
| 9,329,359 B2 * | 5/2016 | Owyang | ................... | B62J 29/00 |
| 2005/0237643 A1 * | 10/2005 | Wu | ................... | B60R 1/06 359/871 |
| 2007/0157758 A1 * | 7/2007 | Shih | ................... | B62K 21/26 74/551.9 |
| 2010/0263168 A1 * | 10/2010 | Hsieh | ................... | B62K 21/125 16/430 |
| 2011/0140471 A1 * | 6/2011 | Suesse | ................... | B60R 1/06 296/1.11 |

FOREIGN PATENT DOCUMENTS

DE    202013100820 U1 *    3/2013    ............. B62K 21/26

* cited by examiner

*Primary Examiner* — Luis A Gonzalez

(57) ABSTRACT

The invention includes a handlebar grip, a binding ring, a rod and a mirror. The handlebar grip has a main body and a tubular seat extending from an end of the main body. An outer diameter of the tubular seat is less than an outer diameter of the main body. The binding ring is a C-shaped body around the tubular seat. Two ends thereof are separately formed with a positioning hole and a threaded hole. The rod has a first end and a second end. The first end is formed with a positioning bar being inserted into the positioning hole. The positioning bar has a through hole. A screw passes through the through hole and the positioning hole and is screwed into the threaded hole to make the binding ring fasten the tubular seat. The mirror is pivotally connected to the second end of the rod.

5 Claims, 8 Drawing Sheets

FIXING STRUCTURE FOR HANDLEBAR GRIP AND SIDE MIRROR OF BICYCLE

BACKGROUND OF THE INVENTION

1. Technical Field

The invention relates to bicycles, particularly to a handlebar of a bicycle.

2. Related Art

Bicycles may serves as tools of transportation, exercise or recreation and possess a property of zero carbon emission, so bicycles become very popular in the world. General bicycles are not provided with side mirrors. Bicycle riders cannot sufficiently understand rear conditions of roads without turning head. In other words, bicycles riders must frequently turn heads to watch the rear condition. This causes a potential risk to those riders on roads.

Although there are side mirrors for additionally installing on a handlebar of bicycle in the market, which uses a binding ring to fasten the handlebar, general high-leveled handlebar grips also use a binding ring to fasten the handlebar to make it unrotatable. As a result, such a handlebar grip and a side mirror need their respective binding rings to fasten the handlebar and cannot share a common binding ring. The two binding rings will occupy a limited space of the handlebar. Also, currently side mirrors for bicycles are easy to be hooked by external objects because they have to be installed at an outer end of the handlebar.

SUMMARY OF THE INVENTION

An object of the invention is to provide a fixing structure for handlebar grip and side mirror of bicycle, which uses a single binding ring to fasten both the handlebar grip and side mirror to save a space of a handlebar to be occupied.

Another object of the invention is to provide a fixing structure for handlebar grip and side mirror of bicycle, whose side mirror can be installed at either an inner end or an outer end of a handlebar grip.

To accomplish the above objects, the fixing structure for handlebar grip and side mirror of bicycle of the invention includes a handlebar grip, a binding ring, a rod and a mirror. The handlebar grip has a main body and a tubular seat extending from an end of the main body. An outer diameter of the tubular seat is less than an outer diameter of the main body. The binding ring is a C-shaped body around the tubular seat. Two ends thereof are separately formed with a positioning hole and a threaded hole. The rod has a first end and a second end. The first end is formed with a positioning bar being inserted into the positioning hole. The positioning bar has a through hole. A screw passes through the through hole and the positioning hole and is screwed into the threaded hole to make the binding ring fasten the tubular seat. The mirror is pivotally connected to the second end of the rod.

DETAILED DESCRIPTION OF THE INVENTION

Figure 1:
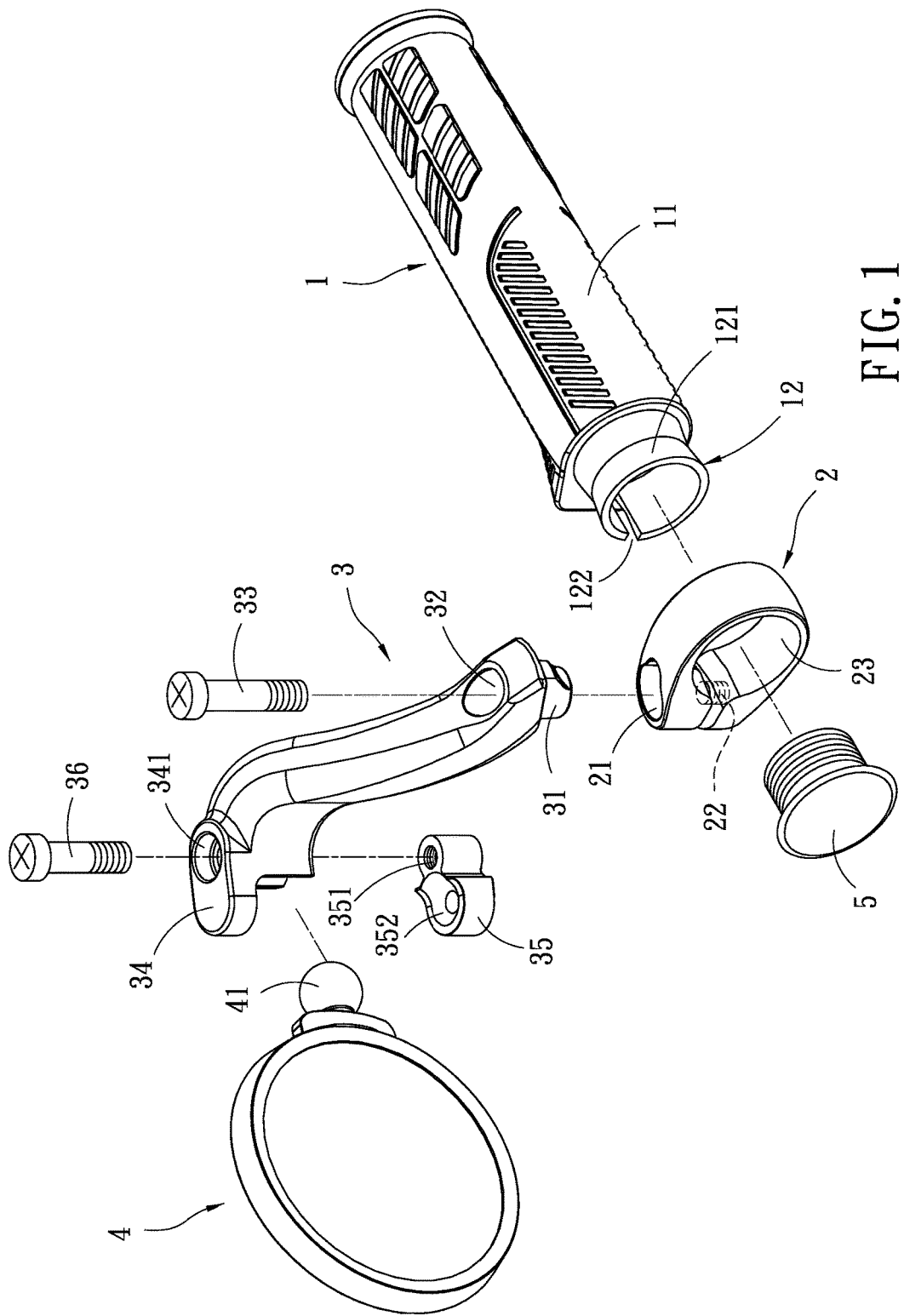
FIG. 1 is an exploded view of the invention.
Figure 2:
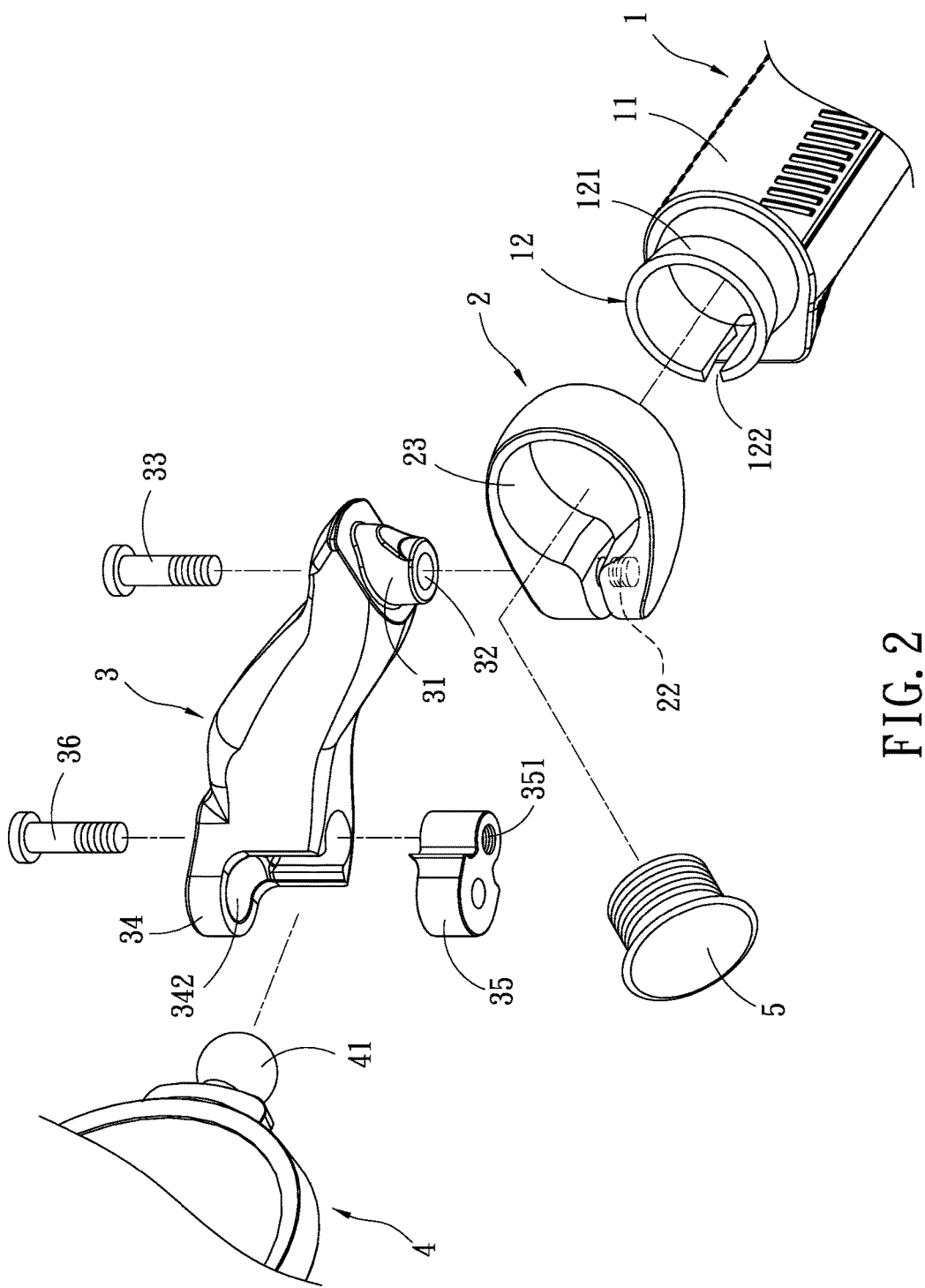
FIG. 2 is another exploded view of the invention.

Please refer to FIGS. 1-4. The invention provides a fixing structure for handlebar grip and side mirror of bicycle includes a handlebar grip 1, a binding ring 2, a rod 3 and a mirror 4. The handlebar grip 1 is used for fasten a handlebar 6 to be held by a rider and has a main body 11 and a tubular seat 12 extending from an end of the main body 11. The tubular seat 12 is a C-shaped tube with a gap 122. An outer diameter of the tubular seat 12 is less than an outer diameter of the main body 11. An inner wall of the tubular seat 12 is smoothly cylindrical and an outer wall thereof is formed with a dented V-shaped surface 121.

Figure 7:
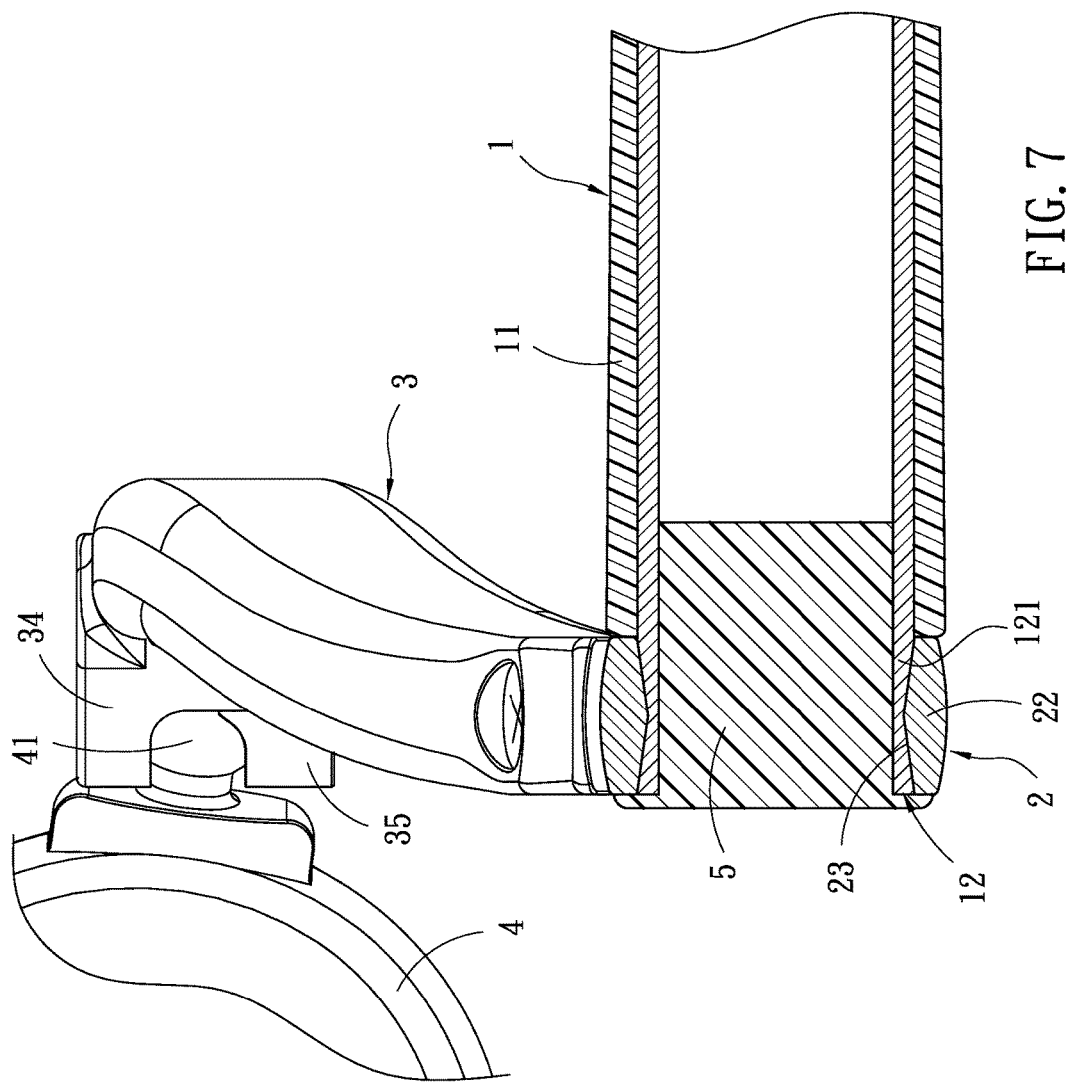
FIG. 7 is a cross-sectional view of the invention along line 7-7 in FIG. 4.
Figure 8:
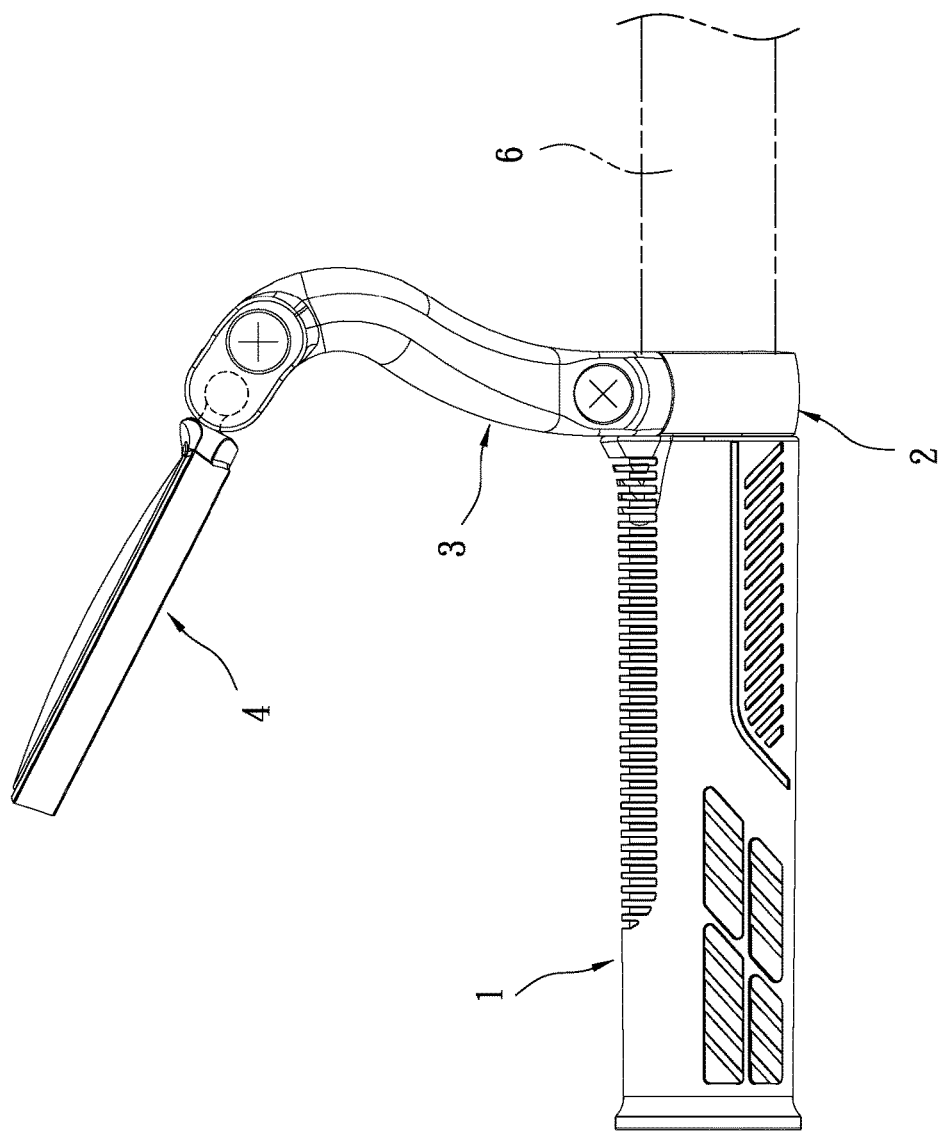
FIG. 8 is a schematic view of the invention in another manner.

The binding ring 2 is a C-shaped body around the tubular seat 12. The binding ring 2 is substantially equal to the tubular seat 12 in width so as to be put around the tubular seat 12. Two ends thereof are separately formed with a positioning hole 21 and a first threaded hole 22. The positioning hole 21 aligns with the first threaded hole 22. The positioning hole 21 is non-circular in shape. In the shown embodiment, the positioning hole 21 is of a water drop shape and penetrates the end of the binding ring 2. An inner wall of the binding ring 2 is formed with a protrudent V-shaped surface 23 corresponding to the dented V-shaped surface 121. When the binding ring 2 is put around the tubular seat 12, the protrudent V-shaped surface 23 will engage with the dented V-shaped surface 121 so that the binding ring 2 will not escape from the tubular seat 12 even if the binding ring 2 is not fastened as shown in FIG. 7. Preferably, an outer end of the binding ring 2 may be covered by a plug 5.

The rod 3 is connected between the binding ring 2 and the mirror 4 and has a first end and a second end. The first end is formed with a positioning bar 31 corresponding to positioning hole 21 in shape so as to be inserted into the positioning hole 21. In this embodiment, the positioning bar 31 is of a water drop shape, too. Because both the positioning hole 21 and the positioning bar 31 are non-circular, the rod 3 cannot rotate against the binding ring 2 after they have engaged to form a positioning effect. The positioning bar 31 has a first through hole 32 penetrating the end of the rod 3. A screw 33 passes through the first through hole 32 and the positioning hole 21 and is screwed into the first threaded hole 22 to make the binding ring 2 fasten the tubular seat 12. At this time, the gap 122 of the tubular seat 12 is compressed to make the handlebar grip 1 is fastened on the handlebar 6. On the other hand, the rod 3 is also fastened on the binding ring 2. Also, because the non-circular shapes of the positioning hole 21 and the positioning bar 31, the rod 3 cannot rotate against the binding ring 2 to make the rod keep its position.

Figure 5:
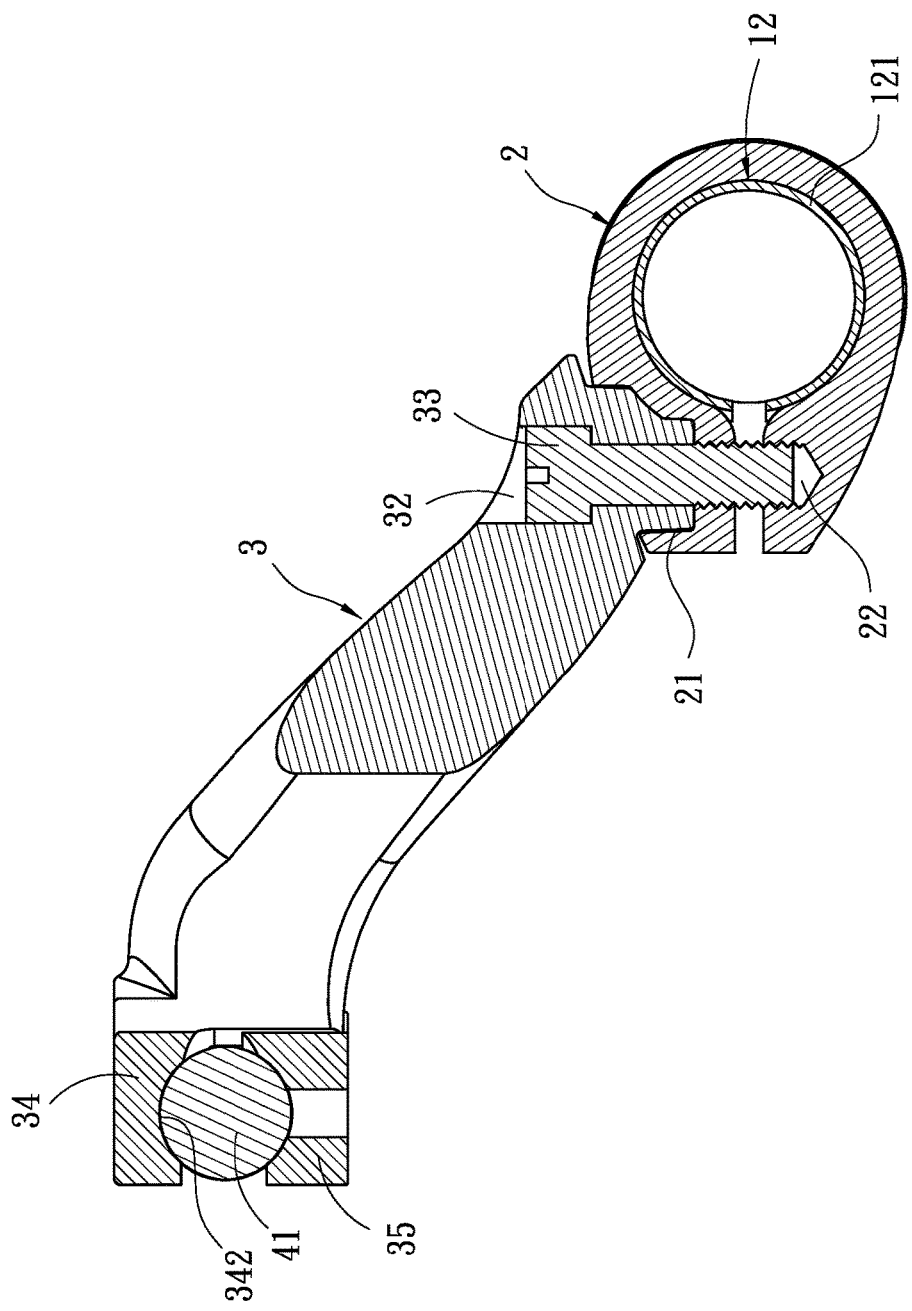
FIG. 5 is a cross-sectional view of the invention along line 5-5 in FIG. 4.
Figure 6:
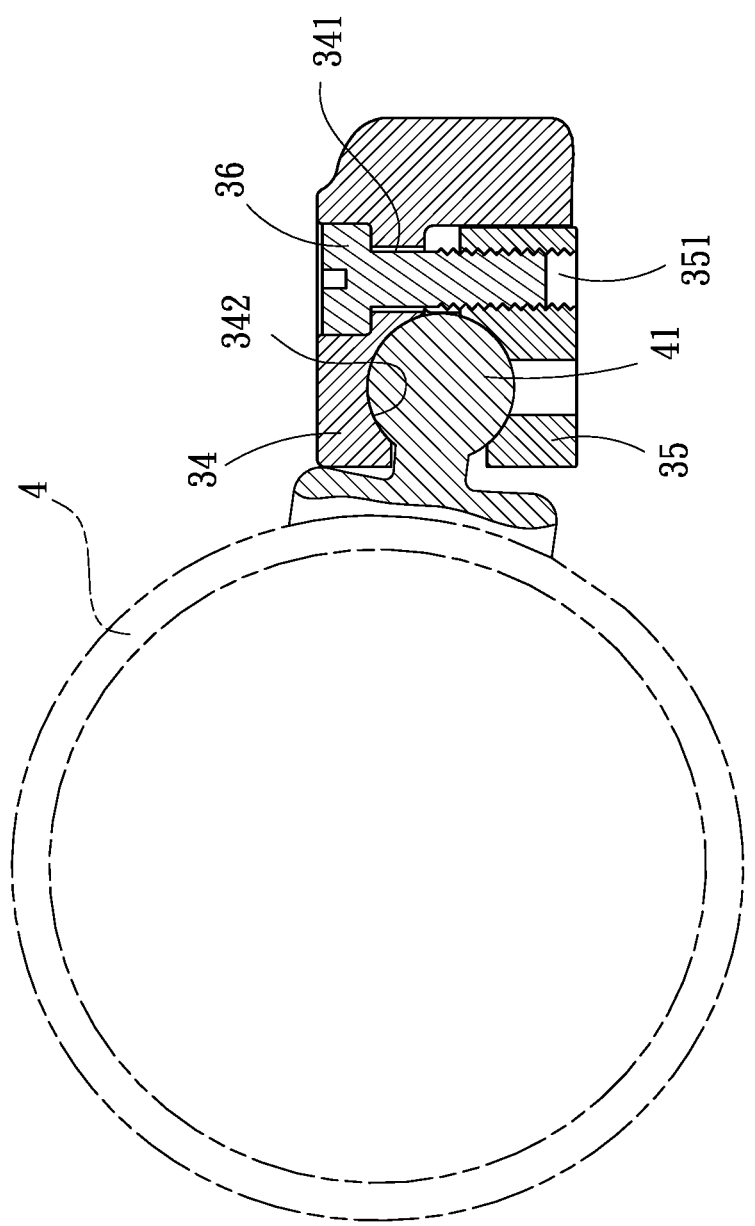
FIG. 6 is a cross-sectional view of the invention along line 6-6 in FIG. 4.

Please refer to FIGS. 5 and 6. The mirror is pivotally connected to the second end of the rod 3 and can rotate against the rod 3. The mirror 4 is provided with a ball 41. The second end of the rod 3 is formed with a connecting seat 34. There is a hemispheric indent 342 in the connecting seat 34. An inner diameter of the hemispheric indent 342 corresponds to an outer diameter of the ball 41. A second through hole 341 through the rod 3 is formed beside the connecting seat 34. A pincher 35 is arranged to correspond to the connecting seat 34. The pincher 35 is formed with a hemispheric indent 352 whose inner diameter corresponds to the diameter of the ball 41. The ball 41 can be pinched by the two hemispheric indents 342, 352. The pincher 35 is formed with a second threaded hole 351 corresponding to the second through hole 341. A screw 35 passes through the second through hole 341 and is screwed into the second threaded hole 351. As a result, the ball 41 can be pinched between the two hemispheric indents 342, 352. Adjusting the tightening of the screw 36 can change the pinching pressure of the two hemispheric indents 342, 352 so that the mirror 4 can be rotated by an external force but can be positioned when no external force is applied.

Figure 3:
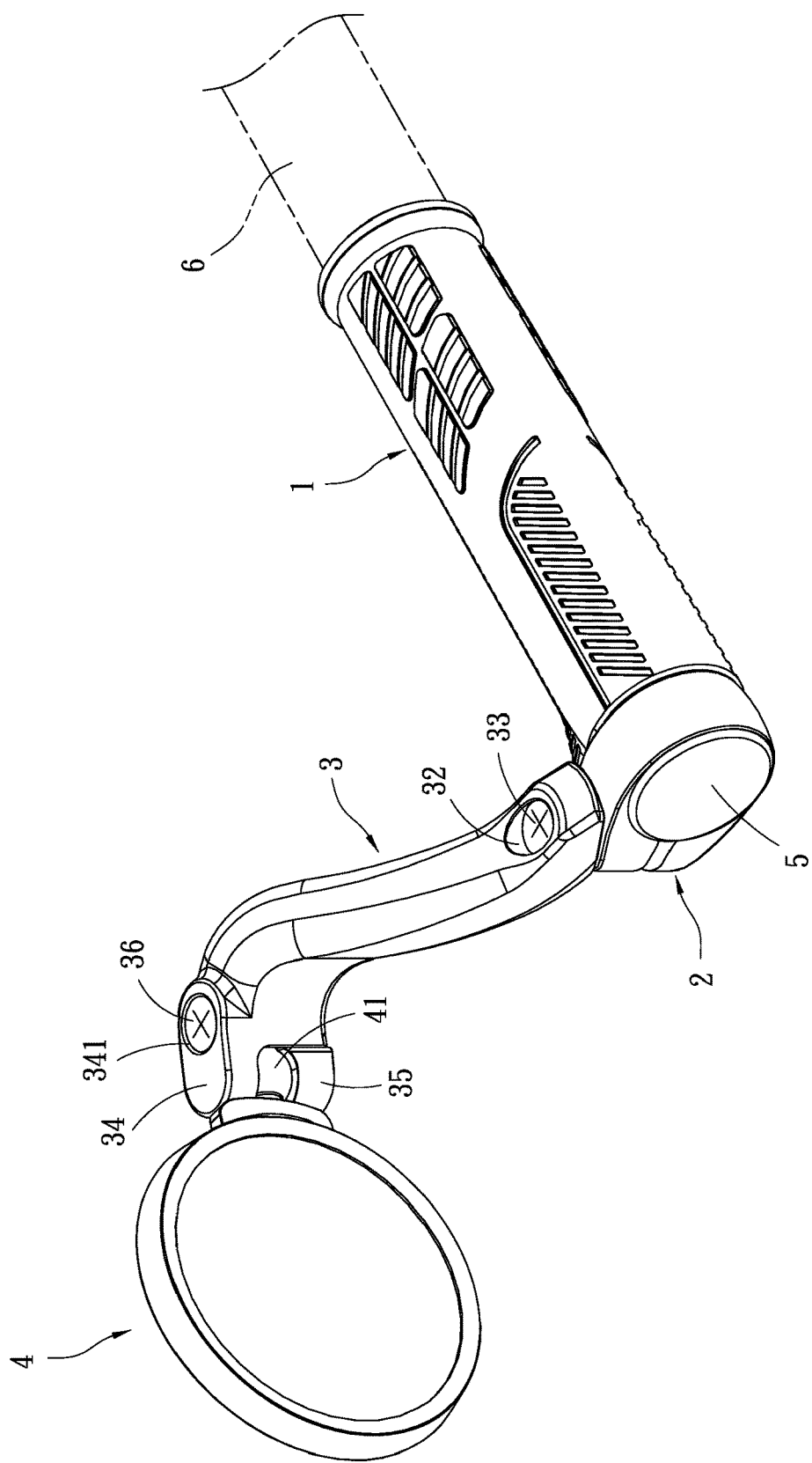
FIG. 3 is an assembled view of the invention.
Figure 4:
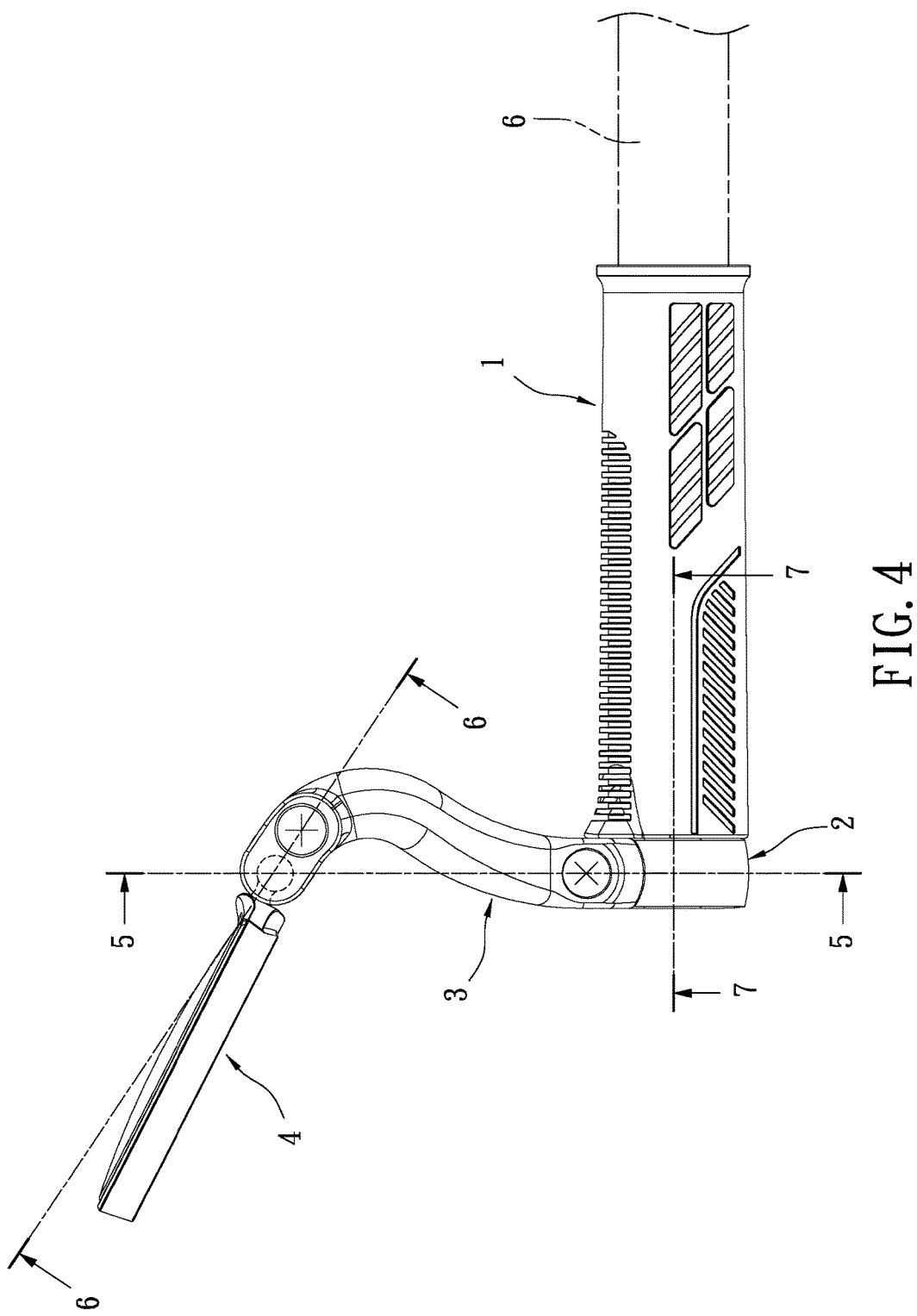
FIG. 4 is a front view of the invention.

The invention can be mounted on the handlebar 6 in two manners. The rod 3 may be located at the outer end of the handlebar 6 as shown in FIGS. 3 and 4. Alternatively, the handlebar grip 1 may be oppositely mounted on the handlebar 6 to make the rod 3 locate at the inner end of the handlebar grip 1. Users may choose either of the two manners.

It will be appreciated by persons skilled in the art that the above embodiment has been described by way of example only and not in any limitative sense, and that various alterations and modifications are possible without departure from the scope of the invention as defined by the appended claims.

What is claimed is:

1. A fixing structure for a side mirror of bicycle, comprising:
   a handlebar grip, having a main body and a tubular seat extending from an end of the main body, wherein an outer diameter of the tubular seat is less than an outer diameter of the main body;
   a binding ring, being a C-shaped body around the tubular seat, and two ends thereof being separately correspondingly formed with a positioning hole and a first threaded hole;
   a rod, having a first end and a second end, the first end being formed with a positioning bar which corresponds to the positioning hole in shape, the positioning bar being inserted into the positioning hole to make an unrotatable connection, the positioning bar having a first through hole, a screw passing through the first through hole and the positioning hole and being screwed into the first threaded hole to make the binding ring fasten the tubular seat; and
   a mirror, pivotally connected to the second end of the rod;
   wherein a whole of an outer wall of the tubular seat is formed with a dented V-shaped surface having two first conical surfaces and a first edge therebetween, and a whole of an inner wall of the binding ring is formed with a protrudent V-shaped surface having two second conical surfaces and a second edge therebetween.

2. The fixing structure of claim 1, wherein the positioning hole and the positioning bar are non-circular in shape.

3. The fixing structure of claim 1, wherein each of the positioning hole and the positioning bar is of a water drop shape.

4. The fixing structure of claim 1, wherein the mirror is provided with a ball, the second end of the rod is formed with a connecting seat, a hemispheric indent is formed in the connecting seat, an inner diameter of the hemispheric indent corresponds to an outer diameter of the ball, a second through hole through the rod is formed beside the connecting seat, a pincher is arranged to correspond to the connecting seat, the pincher is formed with another hemispheric indent whose inner diameter corresponds to the diameter of the ball, the pincher is formed with a second threaded hole corresponding to the second through hole, and a screw passes through the second through hole and is screwed into the second threaded hole to make the ball pinched between the two hemispheric indents.

5. The fixing structure of claim 1, further comprising a plug for covering an outer end of the binding ring.

* * * * *